US012722215B2

(12) United States Patent
Jansson

(10) Patent No.: US 12,722,215 B2
(45) Date of Patent: Sep. 1, 2026

(54) FACE MILLING CUTTER

(71) Applicant: SECO TOOLS AB, Fagersta (SE)

(72) Inventor: Rickard Jansson, Fagersta (SE)

(73) Assignee: Seco Tools AB, Fagersta (SE)

( * ) Notice: Subject to any disclaimer, the term of this patent is extended or adjusted under 35 U.S.C. 154(b) by 543 days.

(21) Appl. No.: 18/268,352

(22) PCT Filed: Dec. 2, 2021

(86) PCT No.: PCT/EP2021/083861

§ 371 (c)(1),
(2) Date: Jun. 20, 2023

(87) PCT Pub. No.: WO2022/135859

PCT Pub. Date: Jun. 30, 2022

(65) Prior Publication Data

US 2024/0066613 A1 Feb. 29, 2024

(30) Foreign Application Priority Data

Dec. 21, 2020 (EP) .................................... 20215956

(51) Int. Cl.
*B23C 5/06* (2006.01)

(52) U.S. Cl.
CPC .......... *B23C 5/06* (2013.01); *B23C 2210/168* (2013.01); *B23C 2210/287* (2013.01)

(58) Field of Classification Search
CPC ........ B23C 5/06; B23C 5/24; B23C 2210/287
See application file for complete search history.

(56) References Cited

U.S. PATENT DOCUMENTS 4,993,891 A * 2/1991 Kaminiski ............... B24D 7/18
407/42
5,868,529 A * 2/1999 Rothballer ............ B23C 5/2462
407/53
10,744,577 B2 * 8/2020 Crespin ................ B23C 5/2462
(Continued)

FOREIGN PATENT DOCUMENTS

EP 0404110 A2 12/1990
EP 3375552 A1 9/2018
(Continued)

OTHER PUBLICATIONS

Translation of JP-2001179521-A (Year: 2001).*

*Primary Examiner* — Jacob J Cigna
(74) *Attorney, Agent, or Firm* — Corinne R. Gorski

(57) ABSTRACT

A face milling cutter includes a tool body, several primary cutting inserts mounted in a respective primary insert seat, a reference insert mounted in a reference insert seat, and a finishing insert mounted in a finishing insert seat. The reference and primary cutting inserts are configured to be detachably mounted in their insert seats in a fixed position as seen in the axial direction of the tool body. The reference insert seat is arranged more forwardly in the tool body than the primary insert seats such that the reference insert projects forwards from the tool body beyond the axially foremost point of each primary cutting insert. The position of the finishing insert is adjustable by an adjustment mechanism to allow it to be positioned with its axially foremost point substantially in level with or more forwardly than the axially foremost point of the reference insert.

15 Claims, 13 Drawing Sheets

(56) References Cited

U.S. PATENT DOCUMENTS

| | | | | |
|---|---|---|---|---|
| 11,045,885 | B2 * | 6/2021 | Joly | B23C 5/2234 |
| 2009/0060662 | A1 * | 3/2009 | Maurer | B23C 5/18<br>407/42 |
| 2010/0215445 | A1 * | 8/2010 | Chen | B23C 5/2462<br>407/41 |
| 2017/0232533 | A1 * | 8/2017 | Crespin | B23C 5/2462<br>407/44 |
| 2019/0118272 | A1 * | 4/2019 | Shibuya | B23C 3/34 |

FOREIGN PATENT DOCUMENTS

| | | | | | |
|---|---|---|---|---|---|
| JP | 2001179521 | A | * | 7/2001 | |
| JP | 4330709 | B2 | | 9/2009 | |
| WO | WO-9300192 | A1 | * | 1/1993 | B23C 5/2213 |

* cited by examiner 61
60
51
50
1
60
9
8a
30
30
3
2a
8
7
4
20
30
60
60
30
D1
7
2
60
40
41
10
60
80
6
82
70
30
7
30
7
30
2b
7
7
5
R

FACE MILLING CUTTER

RELATED APPLICATION DATA

This application is a § 371 National Stage Application of PCT International Application No. PCT/EP2021/083861 filed Dec. 2, 2021 with priority to EP 20215956.2 filed Dec. 21, 2020.

FIELD OF THE INVENTION AND PRIOR ART

A face milling cutter is a rotating cutting tool used for performing face milling operations on a workpiece. In a face milling operation, a flat surface is cut perpendicular to the longitudinal axis of the tool body of the face milling cutter. A face milling cutter may be provided with several cutting inserts detachably mounted in a respective insert seat in the tool body of the face milling cutter. Each individual cutting insert may be provided with several identical cutting edges, to thereby allow each cutting insert to be turned into different working positions. When a cutting edge of a cutting insert has been worn out, the cutting insert may be repositioned in its insert seat and mounted in a new working position with another cutting edge in an active cutting position.

In a face milling cutter of the above-mentioned type, it is previously known to use several mutually identical primary cutting inserts in combination with one or more finishing inserts, wherein each primary cutting insert is configured to perform so-called roughing, i.e. chip removing with a rather large depth of cut, by means of a main cutting edge presently located in an active cutting position, and wherein each finishing insert is configured to perform so-called finishing, i.e. shallow surface smoothing of the milled surface on the workpiece, by means of a surface-wiping cutting edge presently located in an active cutting position. In this case, each finishing insert has to be mounted in the tool body of the face milling cutter in such a position that its active surface-wiping cutting edge projects forwards from the front end of the tool body a short distance beyond the axially foremost point of each primary cutting insert. In order to make possible such a positioning of the finishing inserts in the tool body while taking into account the tolerances of the primary cutting inserts, the finishing inserts and the insert seats, it is previously known to provide for an adjustability of the position of each finishing insert in the axial direction of the tool body. Such adjustability may for instance be provided by means of an adjustable cassette that is mounted in the tool body and configured to support the finishing insert in relation to the tool body.

EP 3 375 552 A1 discloses a face milling cutter comprising a tool body provided with several identical insert seats, where a number of primary cutting inserts are configured to be detachably mounted in a respective one of the insert seats in a fixed position as seen in the axial direction of the tool body and where at least one finishing insert is configured to be detachably mounted in an adjustable cassette in one of the insert seats in order to allow an adjustment of the position of the finishing insert in the axial direction of the tool body.

JP 4330709 B2 discloses another type of face milling cutter provided with several primary cutting inserts mounted in a respective insert seat in a fixed position as seen in the axial direction of a tool body and one finishing insert adjustably mounted in an associated insert seat, to thereby allow an adjustment of the position of the finishing insert in the axial direction of the tool body.

US 2009/0060662 A1 discloses a face milling cutter provided with several primary cutting inserts fixedly mounted in a respective insert seat of a tool body and three finishing inserts adjustably mounted in a respective insert seat of the tool body, to thereby allow an adjustment of the position of each finishing insert in the axial direction of the tool body.

In a face milling cutter of the above-mentioned types with several fixed, i.e. non-adjustably mounted, primary cutting inserts and one or more adjustable finishing inserts, it is important to adjust the position of each finishing insert such that the active surface-wiping cutting edge of the finishing insert projects forwards from the tool body of the face milling cutter a short distance, for instance in the order of 0.03-0.10 mm, beyond the axially foremost point of each primary cutting insert as seen in the longitudinal direction of the tool body to thereby allow the finishing insert to perform the intended finishing of the milled workpiece surface in an appropriate manner. However, the exact position of the axially foremost point of the primary cutting inserts may vary slightly from cutting insert to cutting insert due to the tolerances of the primary cutting inserts and their insert seats. In order to achieve a correct positional adjustment of the adjustable finishing insert in relation to the fixed primary cutting inserts it is therefore necessary to establish, by a suitable measuring technique, the exact position of the axially foremost point of each primary cutting insert before the positional adjustment of the finishing insert can be effected, which may be a rather time-consuming and cumbersome operation.

OBJECT OF THE INVENTION

The object of the present invention is to provide a face milling cutter of the above-mentioned type that has a new and favourable design.

SUMMARY OF THE INVENTION

The face milling cutter according to the invention comprises:

- a tool body having a front end and an opposite rear end, the rear end being configured for attachment to a machine, wherein a longitudinal axis of the tool body extends between the rear end and the front end of the tool body;
- at least two primary cutting inserts;
- a reference insert;
- a finishing insert;
- several insert seats provided in the tool body and evenly or at least substantially evenly distributed in the circumferential direction of the tool body, wherein these insert seats comprise:
  - at least two primary insert seats configured to accommodate a respective one of said at least two primary cutting inserts, wherein each primary cutting insert is configured to be detachably mounted in the associated primary insert seat in a fixed position as seen in the axial direction of the tool body,
  - a reference insert seat configured to accommodate the reference insert, wherein the reference insert is configured to be detachably mounted in the reference insert seat in a fixed position as seen in the axial direction of the tool body, and
  - a finishing insert seat configured to accommodate the finishing insert, wherein the finishing insert is configured to be detachably mounted in the finishing insert seat; and an adjustment mechanism associated to the finishing insert seat for adjustment of the position of the finishing insert in the axial direction of the tool body.

The several insert seats are provided in the tool body and are evenly distributed in the circumferential direction of the tool body or, as a result of manufacturing tolerances or as a result of a differential pitch which is known in the art and which decreases a risk of self-oscillations and chatter, at least substantially evenly distributed in the circumferential direction of the tool body.

The reference insert seat is arranged more forwardly in the tool body than the at least two primary insert seats, as seen in a reference direction from the rear end of the tool body towards the front end of the tool body in parallel with the longitudinal axis of the tool body, such that the reference insert is projecting forwards from the tool body in said reference direction beyond the axially foremost point of each primary cutting insert. The position of the finishing insert in the axial direction of the tool body is adjustable by means of the adjustment mechanism so as to allow the finishing insert to be positioned in the tool body with the axially foremost point of the finishing insert substantially in level with or more forwardly than the axially foremost point of the reference insert as seen in said reference direction. The above-mentioned arrangement of the reference insert seat more forwardly in the tool body as compared to the primary insert seats is intended to make sure that the reference insert, when correctly mounted in the reference insert seat, is always positioned with its axially foremost point more forwardly in the above-mentioned reference direction than the axially foremost point of each primary cutting insert, which in its turn implies that the machine operator only has to pay attention to the position of the axially foremost point of the reference insert when adjusting the axial position of the finishing insert. Thus, there is no need for the machine operator to establish the position of the axially foremost point of any of the primary cutting inserts in connection with an adjustment of the axial position of the finishing insert, which implies that such an adjustment can be performed in a comparatively rapid manner.

Furthermore, the reference insert seat is arranged in the tool body in one of the following positions depending on the number of primary insert seats:

- if the tool body is provided with an even number of primary insert seats, the reference insert seat is arranged diametrically opposite or substantially diametrically opposite to the finishing insert seat; and
- if the tool body is provided with an odd number of primary insert seats, the reference insert seat is arranged as close as possible to a point on the periphery of the tool body located diametrically opposite to the finishing insert seat.

Thus, in the latter case, when taking into account the above-mentioned even or at least substantially even distribution of all the insert seats in the circumferential direction of the tool body, the reference insert seat constitutes one of the two insert seats in the tool body that are arranged closest to the point on the periphery of the tool body located diametrically opposite to the finishing insert seat.

If the tool body is provided with an even number of primary insert seats, the reference insert seat is arranged diametrically opposite to the finishing insert seat. However, as a result of manufacturing tolerances or a presence of a differential pitch, the reference insert may also be arranged substantially diametrically opposite to the finishing insert seat.

By having the reference insert seat arranged diametrically opposite to the finishing insert seat or at least as close as possible to a point on the periphery of the tool body located diametrically opposite to the finishing insert seat, it will be possible, when so desired, to use the reference insert as an additional finishing insert together with the adjustable finishing insert mounted in the finishing insert seat. When the reference insert is to be used as such an additional finishing insert, the machine operator only has to adjust the axial position of the adjustable finishing insert such that it is positioned in the tool body with its axially foremost point in level with, or at least substantially in level with, the axially foremost point of the reference insert as seen in the axial direction of the tool body. In this case, each one of the finishing insert and the reference insert is with advantage positioned in the tool body with its axially foremost point 0.03-0.07 mm, preferably 0.05 mm, more forwardly than the axially foremost point of each primary cutting insert as seen in the above-mentioned reference direction. In a situation when one single finishing insert is to be used, the axial position of the adjustable finishing insert mounted in the finishing insert seat is adjusted such that it is positioned in the tool body with its axially foremost point more forwardly than the axially foremost point of the reference insert as seen in the reference direction.

According to an embodiment of the invention, the finishing insert seat is arranged in a cassette, which is mountable in the tool body and configured to support the finishing insert. In this case, the adjustment mechanism may be configured to adjust the position of the cassette in the tool body, wherein the position of the finishing insert in the axial direction of the tool body is adjustable by adjustment of the position of the cassette in the tool body. As an alternative, the finishing insert seat may be formed directly in the tool body, wherein the adjustment mechanism is configured to adjust the position of the finishing insert in the axial direction of the tool body by acting directly on the finishing insert.

In view of the normal tolerances of the different types of cutting inserts conventionally used in a face milling cutter, the reference insert seat is with advantage arranged 0.02-0.10 mm, preferably 0.03-0.07 mm, more preferably 0.05 mm, more forwardly in the tool body than the at least two primary insert seats as seen in the above-mentioned reference direction. The dimensional tolerances of ground cutting inserts, i.e. cutting inserts machined by grinding, within the same batch of cutting inserts are normally in the order of ±0.005 mm. By having the reference insert seat arranged at least 0.02 mm more forwardly in the tool body than the at least two primary insert seats as seen in the reference direction, it is ensured that the reference insert will always be positioned in the tool body with its axially foremost point more forwardly in the reference direction than the axially foremost point of each primary cutting insert when the reference insert and the primary cutting inserts consist of ground cutting inserts from the same batch. If the reference insert seat is arranged more than 0.10 mm more forwardly in the tool body than the at least two primary insert seats as seen in the reference direction, there is a risk that the finishing insert will project too much in the axial direction of the tool body beyond the axially foremost points of the primary cutting inserts and will cut a chip of a thickness that is undesirably large, which will cause rapid wear of the finishing insert. The dimensional tolerances of directly pressed cutting inserts within the same batch of cutting inserts may be in the order of ±0.015 mm. By having the reference insert seat arranged at least 0.03 mm more forwardly in the tool body than the at least two primary insert seats as seen in the reference direction, it is ensured that the reference insert will always be positioned in the tool body with its axially foremost point more forwardly in the reference direction than the axially foremost point of each primary cutting insert when the reference insert and the primary cutting inserts consist of directly pressed cutting inserts from the same batch. An arrangement of the reference insert seat more than 0.07 mm more forwardly in the tool body than the at least two primary insert seats as seen in the reference direction may result in an undesirably long axial distance between the axially foremost point of the reference insert and the axially foremost points of the primary cutting inserts when the primary cutting inserts, and possibly also the reference insert, consist of directly pressed cutting inserts from the same batch, which implies that there is a risk that the finishing insert will project too much in the axial direction of the tool body beyond the axially foremost points of the primary cutting inserts and thereby will be subjected to rapid wear. An arrangement of the reference insert seat 0.05 mm more forwardly in the tool body than the at least two primary insert seats as seen in the reference direction will give a good balance between good surface finish and service life of the finishing insert.

According to another embodiment of the invention, the radially outermost point of the finishing insert is arranged closer to the longitudinal axis of the tool body than the radially outermost point of each one of the at least two primary cutting inserts. The finishing insert is hereby subjected to less wear than the primary cutting inserts, which is particularly favourable when the finishing insert has the form of a wiper insert that is mountable to the tool body in only one working position or in fewer alternative working positions than the primary cutting inserts.

According to another embodiment of the invention, the radially outermost point of the reference insert is arranged closer to the longitudinal axis of the tool body than the radially outermost point of each one of the at least two primary cutting inserts. The reference insert is hereby subjected to less wear than the primary cutting inserts, which is particularly favourable when the reference insert has the form of a wiper insert that is mountable to the tool body in only one working position or in fewer alternative working positions than the primary cutting inserts.

The at least two primary cutting inserts, the reference insert and the finishing insert may be substantially geometrically identical to each other. Thus, in this case no specially designed wiper insert is used in the finishing insert seat or in the reference insert seat. However, as an alternative, the finishing insert may have the form of a specially designed wiper insert with a shape that differs from the shape of the at least two primary cutting inserts. In the latter case, it will be possible to use primary cutting inserts of a type without any surface-wiping cutting edge. A wiper insert is provided with a surface-wiping cutting edge that is longer than the possible surface-wiping cutting edges on the primary cutting inserts. When also the reference insert is to perform finishing, also the reference insert may have the form of a specially designed wiper insert with a shape that differs from the shape of the at least two primary cutting inserts.

In a face milling cutter where the at least two primary cutting inserts and the reference insert are substantially geometrically identical to each other, the position of the finishing insert in the axial direction of the tool body is with advantage adjustable by means of the adjustment mechanism so as to allow the finishing insert to be positioned in the tool body with its axially foremost point 0.03-0.07 mm, preferably 0.05 mm, more forwardly than the axially foremost point of the reference insert as seen in the above-mentioned reference direction.

The primary cutting inserts are preferably of a type that allows each primary cutting insert to be mounted in the associated primary insert seat in two or more different working positions. Also the reference insert may be of a type that allows it to be mounted in the reference insert seat in two or more different working positions.

According to another embodiment of the invention, the tool body is provided with a marking showing the position of the reference insert seat on the tool body. Hereby, the machine operator may identify the reference insert in a rapid and reliable manner in a situation when the axial position of the finishing insert is to be adjusted.

Further advantageous features of the face milling cutter according to the present invention will appear from the dependent claims and the description following below.

BRIEF DESCRIPTION OF THE DRAWINGS

With reference to the appended drawings, a specific description of embodiments of the invention cited as examples follows below. In the drawings.

DETAILED DESCRIPTION OF EMBODIMENTS OF THE INVENTION

Figure 1:
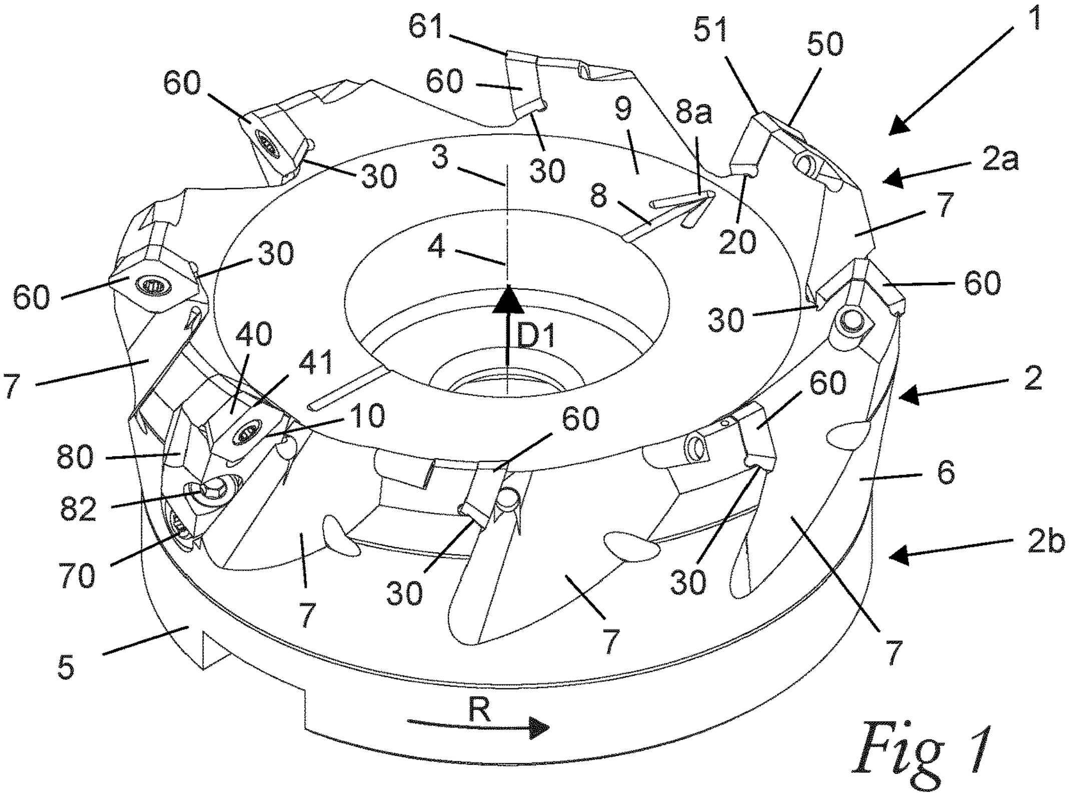
FIG. 1 is a perspective view of a face milling cutter according to a first embodiment of the present invention.
Figure 2:
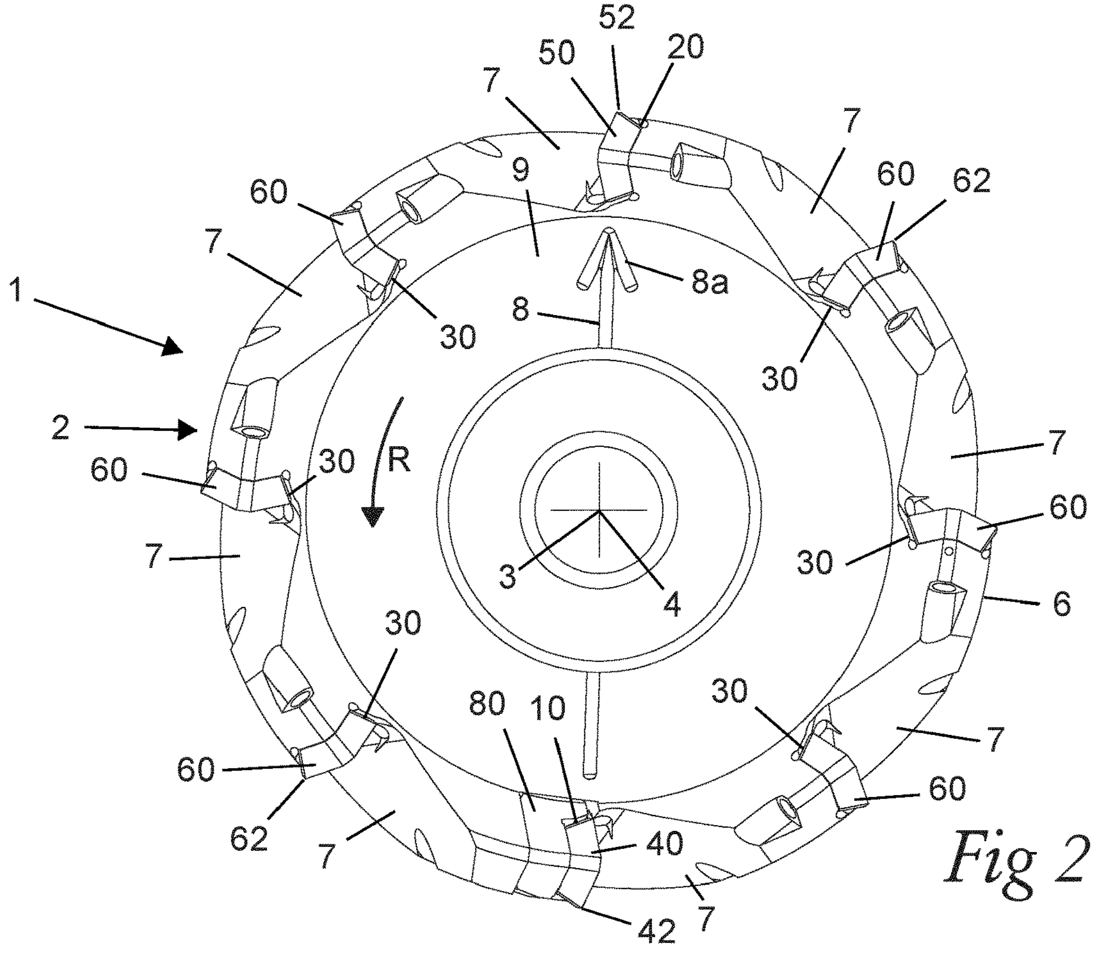
FIG. 2 is a planar view of the face milling cutter of FIG. 1, FIGS. 3 and 4 are partly exploded perspective views from different directions of the face milling cutter of FIG. 1.
Figure 3:
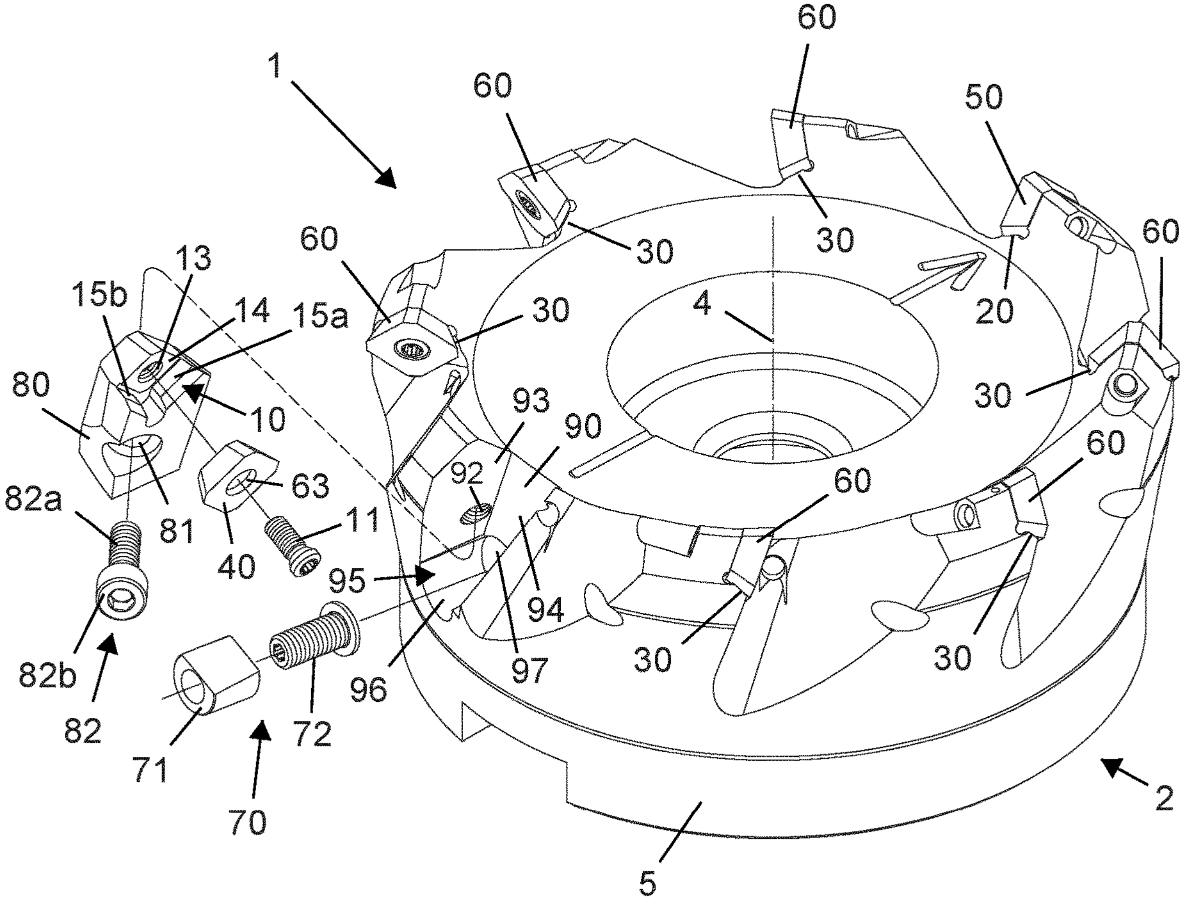
Figure 4:
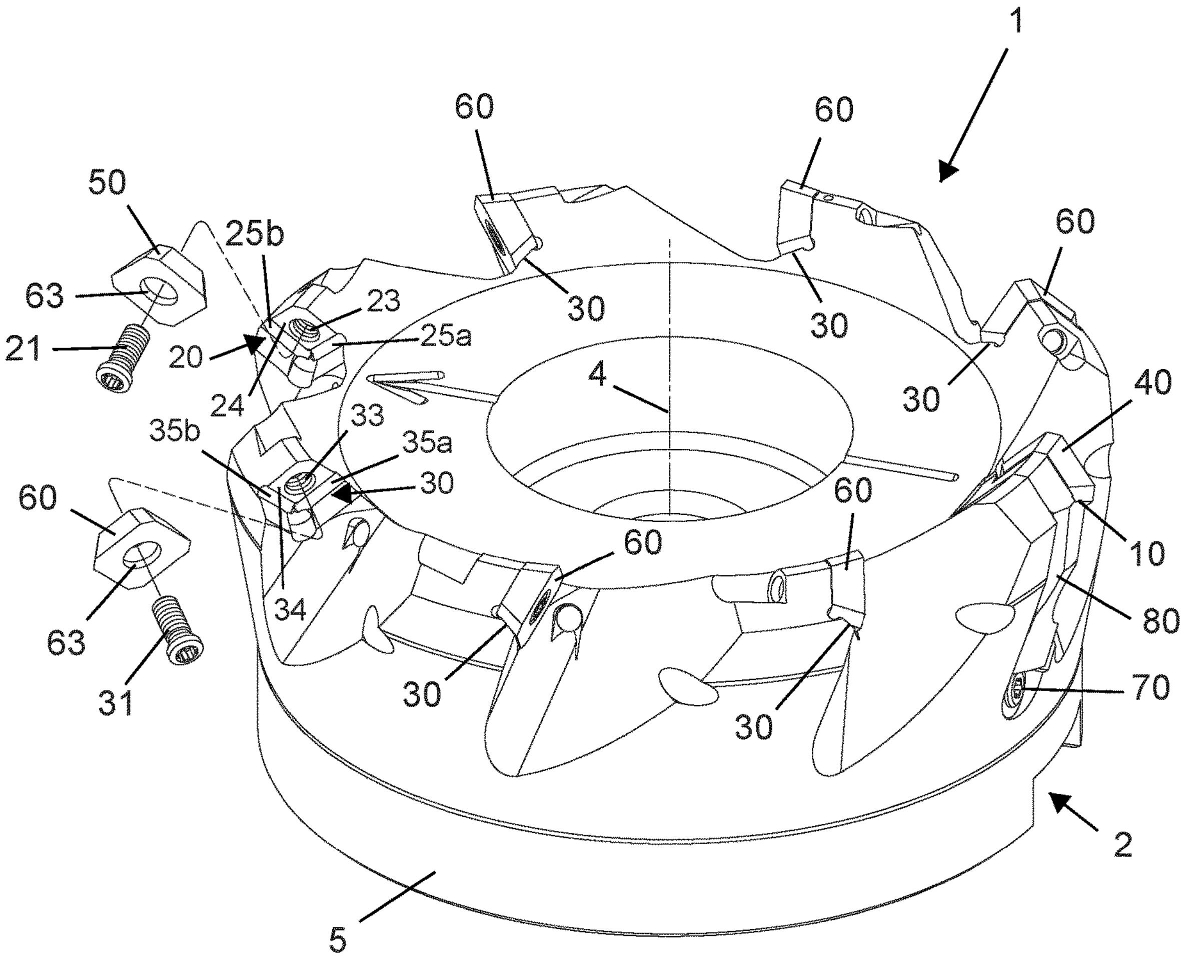
Figure 5:
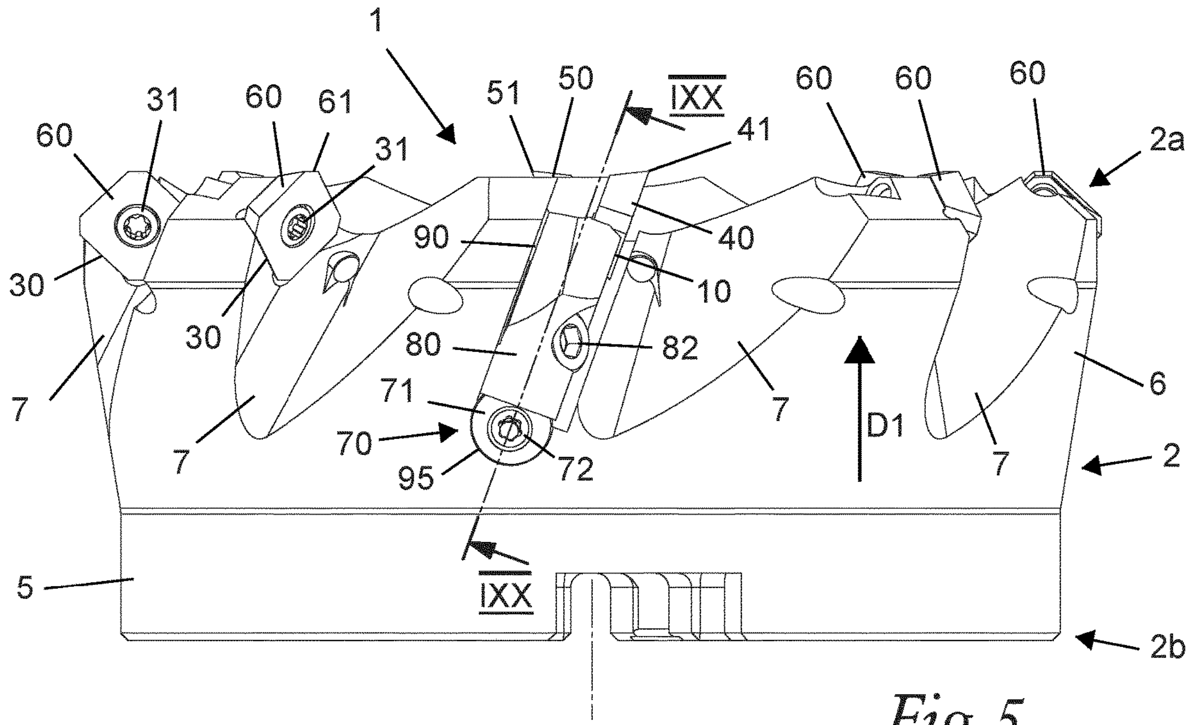
FIG. 5 is a lateral view of the face milling cutter of FIG. 1.

Three different embodiments of a face milling cutter 1 according to the present invention are illustrated in FIGS. 1-13. The face milling cutter 1 comprises an elongated tool body 2 and is configured to be rotated about an axis of rotation 3. The tool body 2 has a front end 2*a* and an opposite rear end 2*b*. A longitudinal axis 4 of the tool body 2 extends between the rear end 2*b* and the front end 2*a* of the tool body, wherein this longitudinal axis 4 coincides with the axis of rotation 3 of the face milling cutter 1. A rear part of the tool body 2 forms a connection member 5, through which the tool body 2 is mountable, directly or via an intermediate tool holder, to a rotating spindle or the similar of a machine, for instance a milling machine or a drilling machine. A front part of the tool body 2 is provided with several insert seats 10, 20, 30, which are evenly or at least substantially evenly distributed in the circumferential direction of the tool body 2 and configured to receive a respective cutting insert 40, 40', 50, 50', 60. Thus, the insert seats 10, 20, 30 are evenly or at least substantially evenly distributed about the longitudinal axis 4 of the tool body 2. Each insert seat 10, 20, 30 is located at a transition between the front end 2*a* and the periphery 6 of the tool body 2, wherein each insert seat 10, 20, 30 is open towards the front end 2*a* of the tool body 2 in order to allow a cutting insert 40, 40', 50, 50', 60 mounted in the insert seat to project in the axial direction of the tool body 2 beyond the front end 2*a* thereof and also open towards the periphery 6 of the tool body 2 in order to allow a cutting insert 40, 40', 50, 50', 60 mounted in the insert seat to project in the radial direction of the tool body 2 beyond the periphery 6 thereof. A chip pocket 7 is provided in the tool body 2 in front of each insert seat 10, 20, 30 as seen in the intended direction of rotation R of the tool body 2.

The insert seats 10, 20, 30 provided in the tool body 2 comprise:

- one finishing insert seat 10 configured to accommodate and support a cutting insert that constitutes a finishing insert 40, 40' of the face milling cutter 1;
- one reference insert seat 20 configured to accommodate and support a cutting insert that constitutes a reference insert 50, 50' of the face milling cutter 1; and
- two or more primary insert seats 30 configured to accommodate and support a respective cutting insert that constitutes a primary cutting insert 60 of the face milling cutter 1.

In the embodiments illustrated in FIGS. 1-11, the tool body 2 is provided with six primary insert seats 60 spaced apart in the circumferential direction of the tool body. In the embodiment illustrated in FIGS. 12-13, the tool body 2 is provided with five primary insert seats 30 spaced apart in the circumferential direction of the tool body. However, the tool body 2 may as an alternative, inter alia depending on the diameter of the tool body, be provided with any other suitable number of primary insert seats 30, as long as they are more than two in number. A smaller diameter tool body may for instance be provided with two primary insert seats 30, whereas a larger diameter tool body may be provided with more than six primary insert seats 30.

Figure 12:
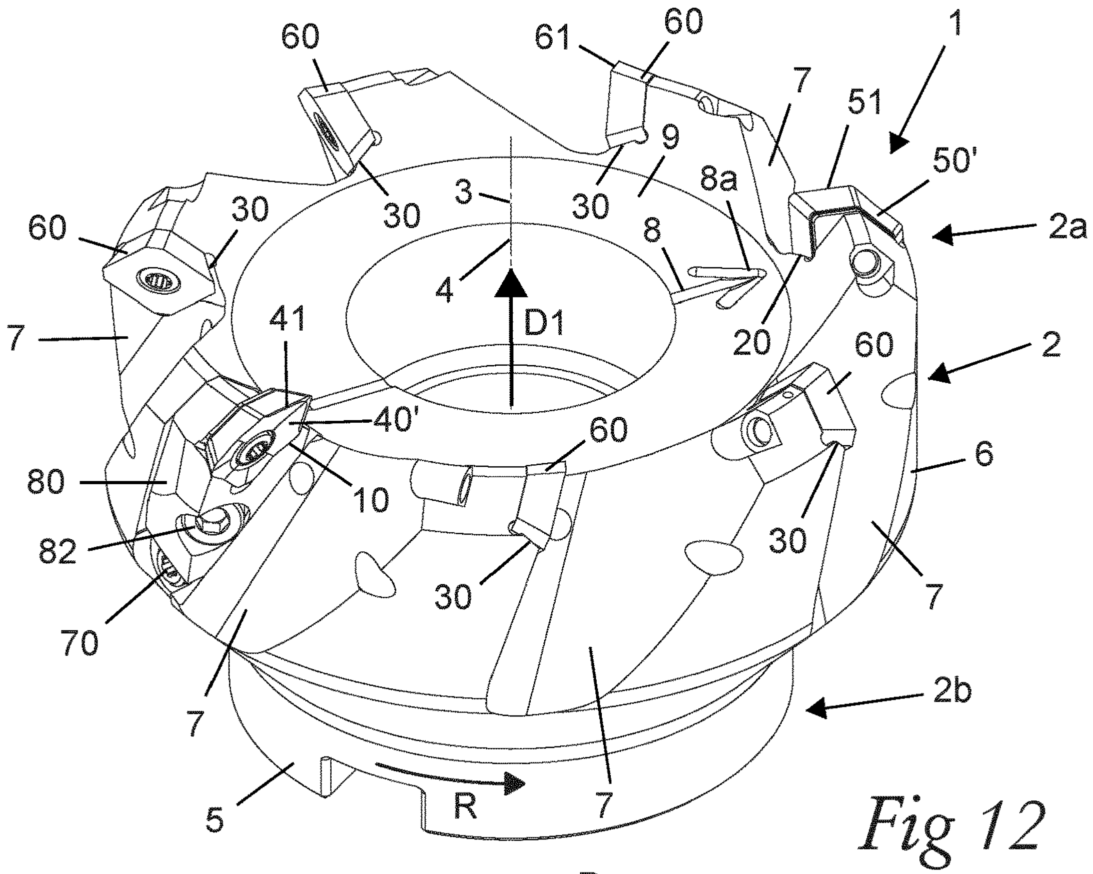
FIG. 12 is a perspective view of a face milling cutter according to a third embodiment of the invention.
Figure 13:
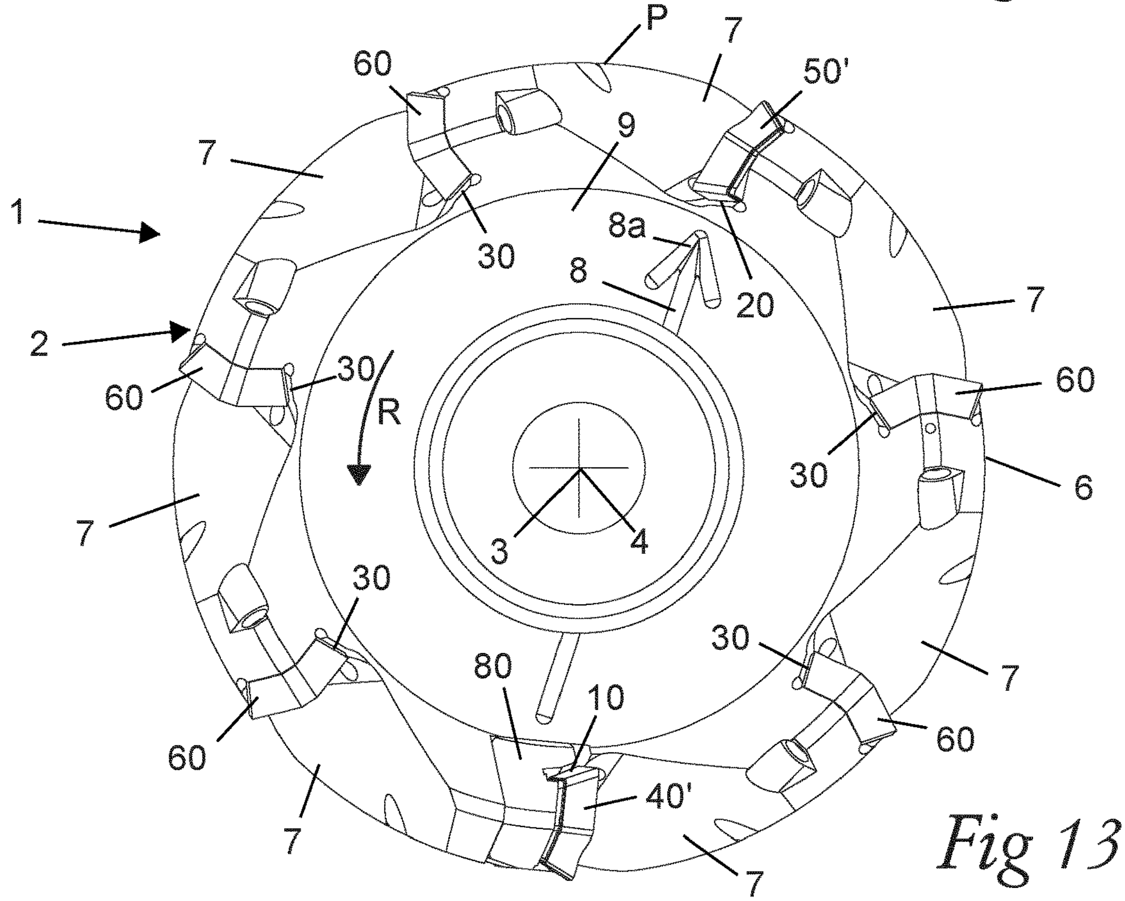
FIG. 13 is a planar view of the face milling cutter of FIG. 12.

When the tool body 2 is provided with an even number of primary insert seats 30, the finishing insert seat 10 and the reference insert seat 20 are located diametrically opposite to each other, as illustrated in FIGS. 1-4 and 7-10. When the tool body 2 is provided with an odd number of primary insert seats 30, the reference insert seat 20 constitutes one of the two insert seats in the tool body 2 that are arranged closest to a point P on the periphery 6 of the tool body located diametrically opposite to the finishing insert seat 10, as illustrated in FIGS. 12 and 13. The tool body 2 is with advantage provided with a marking 8 showing the position of the reference insert seat 20 on the tool body 2. In the illustrated embodiments, this marking 8 is arranged on a front end surface 9 of the tool body 2 and has the form of an arrow with an arrowhead 8*a* pointing towards the reference insert seat 20. The marking 8 may of course be designed in any other suitable manner and may as an alternative be arranged on the periphery 6 of the tool body 2 or in the chip pocket 7 associated with the reference insert seat 20.

The finishing insert 40, 40' is detachably mountable in the finishing insert seat 10. The face milling cutter 1 comprises an adjustment mechanism 70, which is associated to the finishing insert seat 10 and by means of which the position of the finishing insert 40, 40' in the axial direction of the tool body 2 is adjustable. Thus, the exact positioning of the finishing insert 40, 40' along the longitudinal axis 4 of the tool body 2 is adjustable by means of the adjustment mechanism 70.

The reference insert 50, 50' is configured to be detachably mounted in the reference insert seat 20 in a fixed position as seen in the axial direction of the tool body 2. Thus, the position of the reference insert 50, 50' in the axial direction of the tool body 2 is not adjustable. In a corresponding manner, each primary cutting insert 60 is configured to be detachably mounted in its associated primary insert seat 30 in a fixed position as seen in the axial direction of the tool body 2. Thus, the position of each primary cutting insert 60 in the axial direction of the tool body 2 is not adjustable.

The primary insert seats 30 are arranged in level with each other as seen in the axial direction of the tool body 2, such that the axially foremost point 61 of each individual primary cutting insert 60, as seen in a reference direction D1 from the rear end 2*b* of the tool body 2 towards the front end 2*a* of the tool body in parallel with the longitudinal axis 4 of the tool body, is located in level with the axially foremost point 61 of each one of the other primary cutting inserts 60, when the primary cutting inserts 60 are mounted in the primary insert seats 30.

Figure 6:
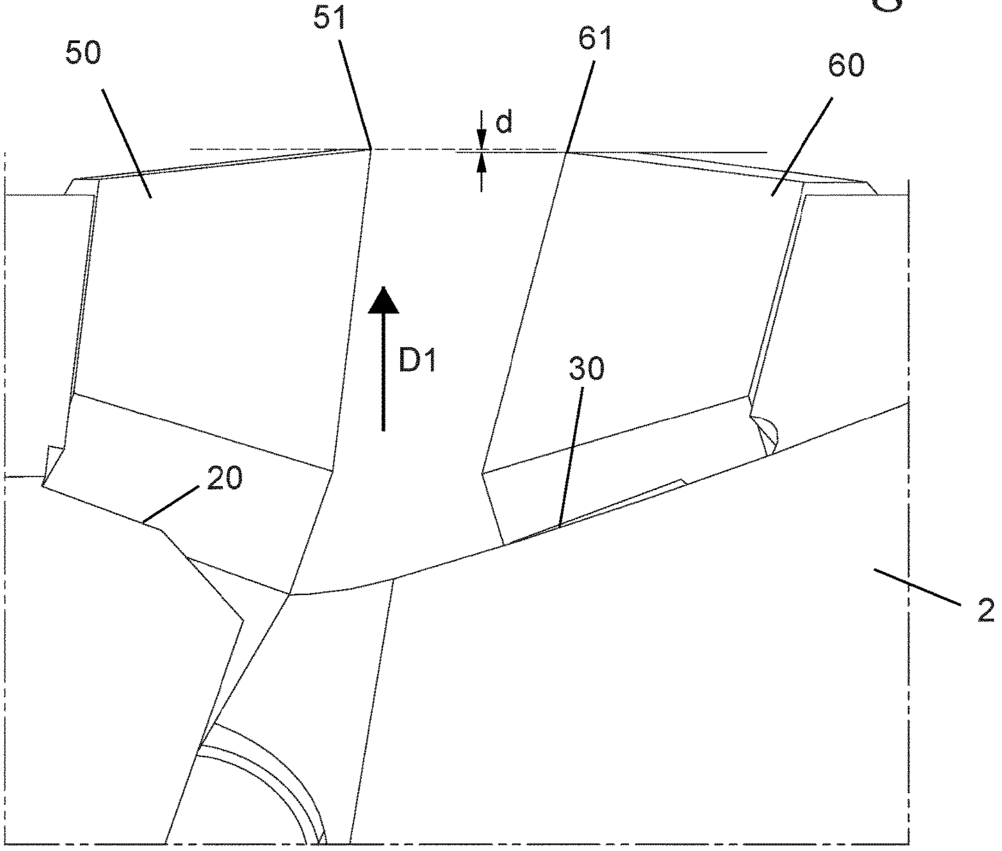
FIG. 6 is a schematic perspective view in larger scale of a primary cutting insert and a reference insert included in the face milling cutter of FIG. 1.
Figure 7:
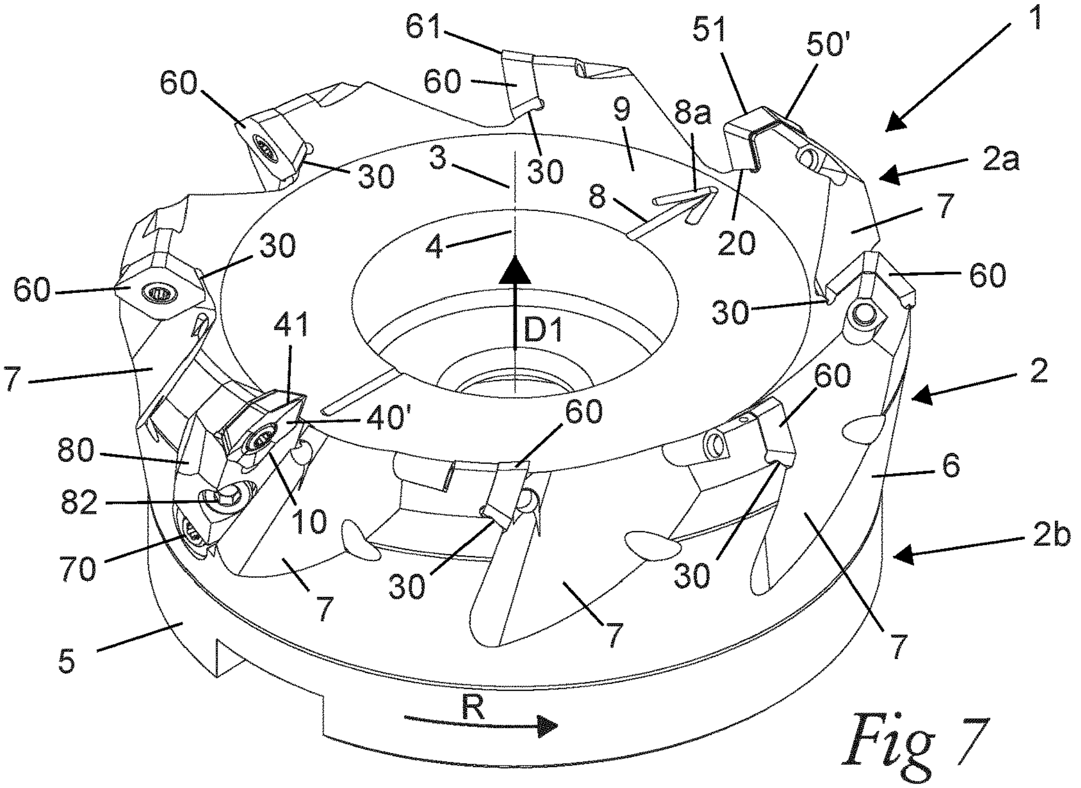
FIG. 7 is a perspective view of a face milling cutter according to a second embodiment of the invention.
Figure 8:
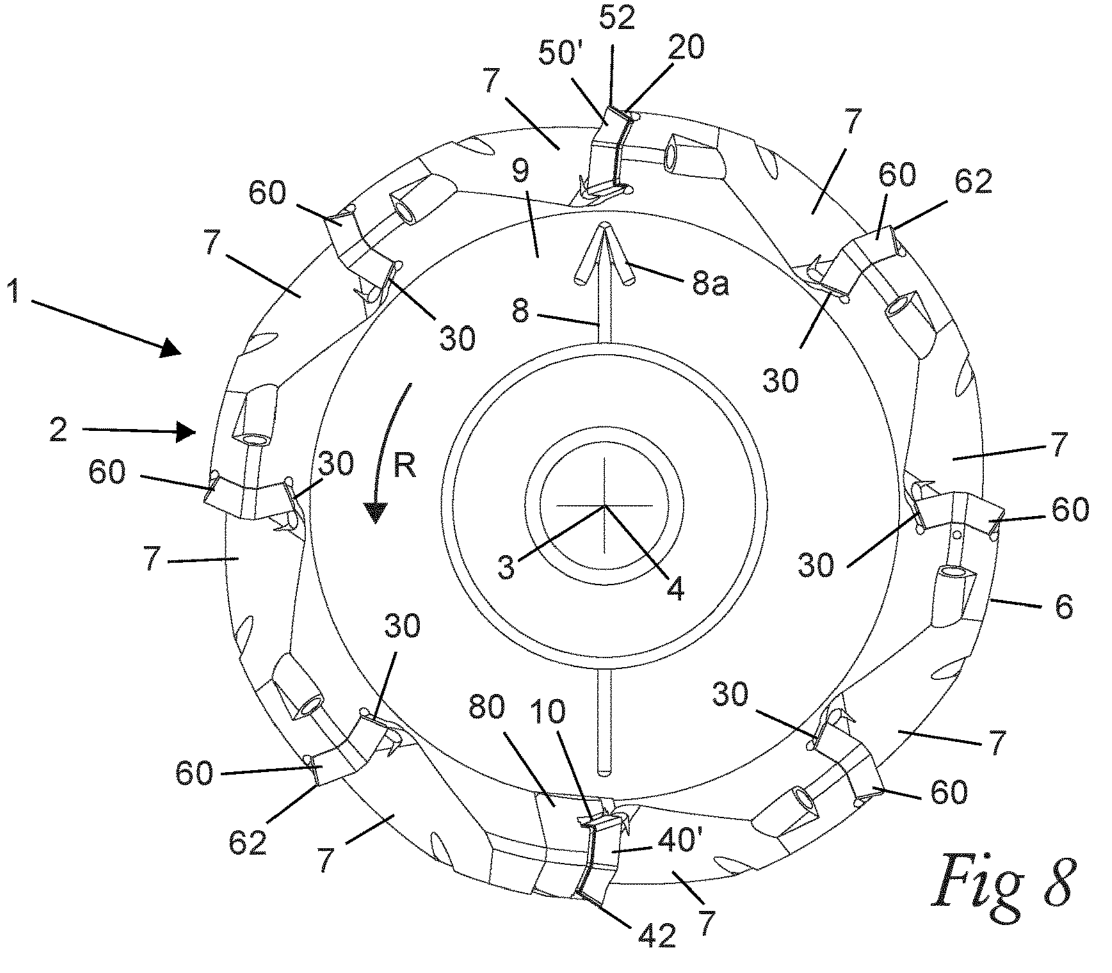
FIG. 8 is a planar view of the face milling cutter of FIG. 7, FIGS. 9 and 10 are partly exploded perspective views from different directions of the face milling cutter of FIG. 7.
Figure 9:
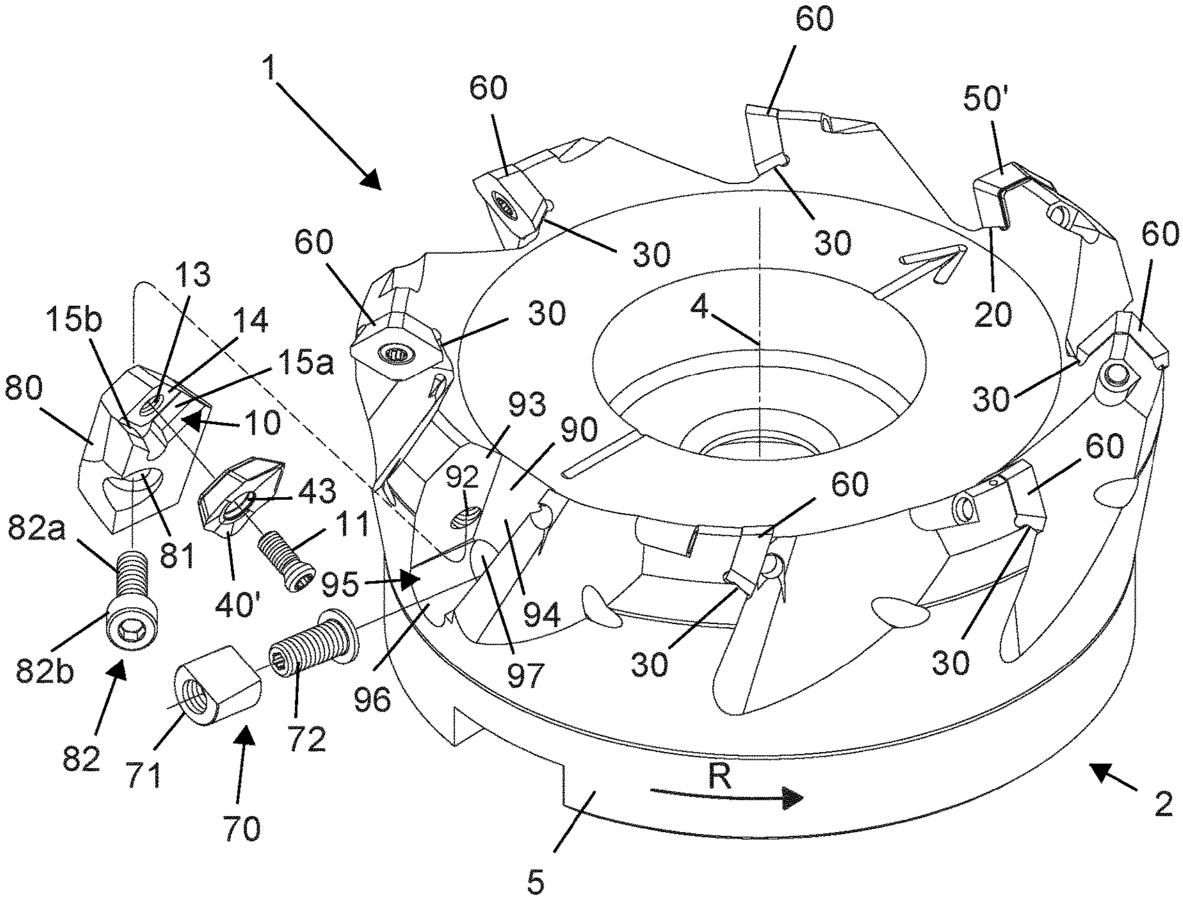
Figure 10:
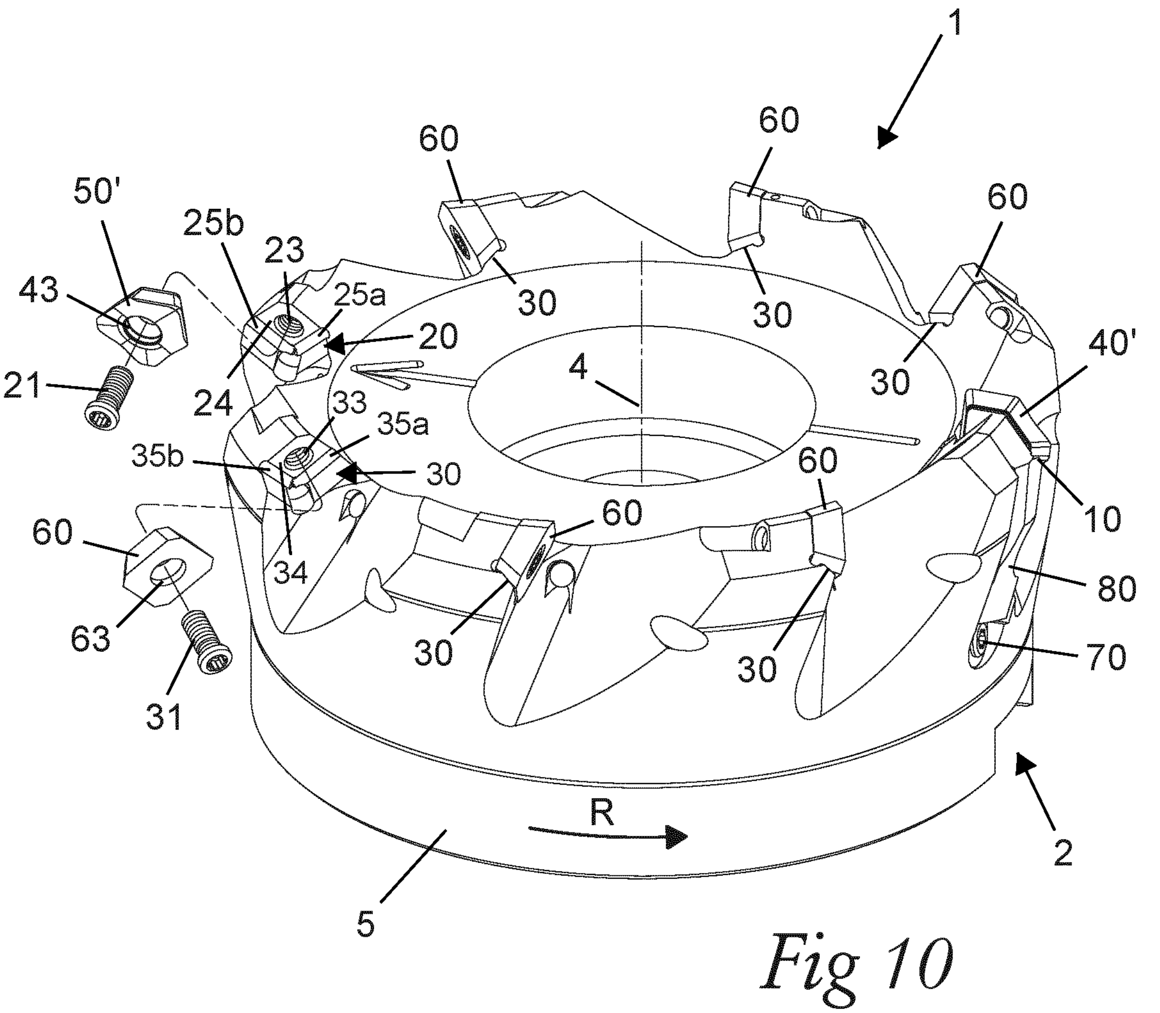
Figure 11:
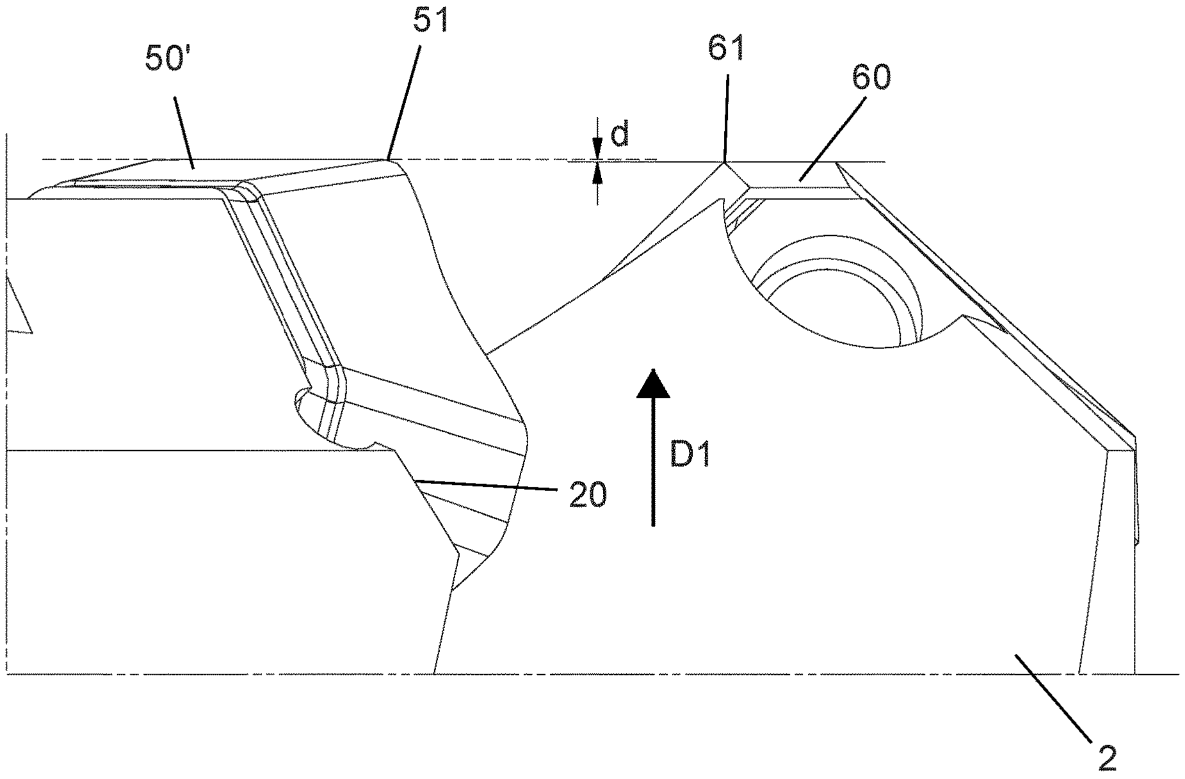
FIG. 11 is a schematic perspective view in larger scale of a primary cutting insert and a reference insert included in the face milling cutter of FIG. 7.

The reference insert seat 20 is arranged more forwardly in the tool body 2 than each primary insert seat 30 as seen in the reference direction D1, such that the reference insert 50, 50', when mounted in the reference insert seat 20 projects forwards from the tool body 2 in the reference direction D1 a short distance d beyond the axially foremost point 61 of each primary cutting insert 60, as schematically illustrated in FIGS. 6 and 11. Thus, when the reference insert 50, 50' and the primary cutting inserts 60 are mounted in their associated insert seats 20, 30, the axially foremost point 51 of the reference insert 50, 50' is located more forwardly in the reference direction D1 than the axially foremost point 61 of each primary cutting insert 60. The reference insert seat 50, 50' is suitably arranged 0.02-0.10 mm, preferably 0.03-0.07 mm, more preferably 0.05 mm, more forwardly in the tool body 2 than each primary insert seat 30 as seen in the reference direction D1.

The position of the finishing insert 40, 40' in the axial direction of the tool body 2 is adjustable by means of the adjustment mechanism 70 so as to allow the finishing insert 40, 40' to be positioned in the tool body 2 with the axially foremost point 41 of the finishing insert, as seen in the reference direction D1, in level with or at least substantially in level with the axially foremost point 51 of the reference insert 50, 50' as seen in the reference direction D1 or more forwardly in the reference direction D1 than the axially foremost point 51 of the reference insert 50, 50'. The adjustment mechanism 70 is preferably so designed that it allows the finishing insert 40, 40' to be positioned in the tool body 2 with its axially foremost point 41 located at least 0.03 mm, preferably at least 0.05 mm, more forwardly in the reference direction D1 than the axially foremost point 51 of the reference insert 50, 50'.

The axially foremost point 51 of the reference insert 50, 50' is intended to be used as a reference point by a machine operator when there is a need to adjust the position of the finishing insert 40, 40' in the axial direction of the tool body 2. Such an adjustment may for instance be necessary in a situation when a new finishing insert 40, 40' has been mounted in the finishing insert seat 10 and/or a new reference insert 50, 50' has been mounted in the reference insert seat 20 or in a situation when any of the finishing insert 40, 40' and reference insert 50, 50' has been repositioned in its insert seat 10, 20 and mounted in a new working position. When the face milling cutter 1 is to be used in a face milling operation where the finishing is performed with only one finishing insert, the axial position of the finishing insert 40, 40' mounted in the finishing insert seat 10 is adjusted such that it is positioned in the tool body 2 with its axially foremost point 41 located more forwardly in the reference direction D1 than the axially foremost point 51 of the reference insert 50, 50'. When the face milling cutter 1 is to be used in a face milling operation where the finishing is performed jointly by two finishing inserts, the axial position of the finishing insert 40, 40' mounted in the finishing insert seat 10 is adjusted such that it is positioned in the tool body 2 with its axially foremost point 41 located in level with, or at least substantially in level with, the axially foremost point 51 of the reference insert 50, 50', as seen in the reference direction D1. In the latter case, the reference insert 50, 50' acts as a second finishing insert together with the adjustable first finishing insert 40, 40' mounted in the finishing insert seat 10.

The radially outermost point 42 of the finishing insert 40, 40', i.e. the point of the finishing insert that is located at the longest distance from the longitudinal axis 4 of the tool body 2, is preferably arranged closer to the longitudinal axis 4 of the tool body 2 than the radially outermost point 62 of each primary cutting insert 60. Also the radially outermost point 52 of the reference insert 50, 50', i.e. the point of the reference insert that is located at the longest distance from the longitudinal axis 4 of the tool body 2, is preferably arranged closer to the longitudinal axis 4 of the tool body 2 than the radially outermost point 62 of each primary cutting insert 60.

Figure 14:
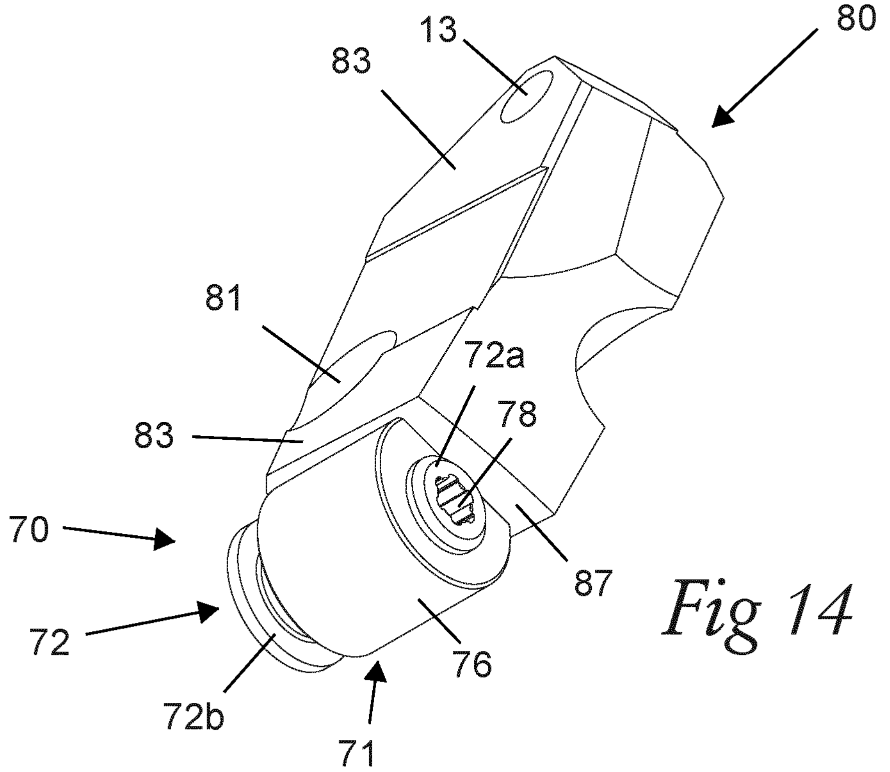
FIG. 14 is a perspective view of a cassette and an adjustment mechanism included in the face milling cutters of FIGS. 1-13.
Figure 15:
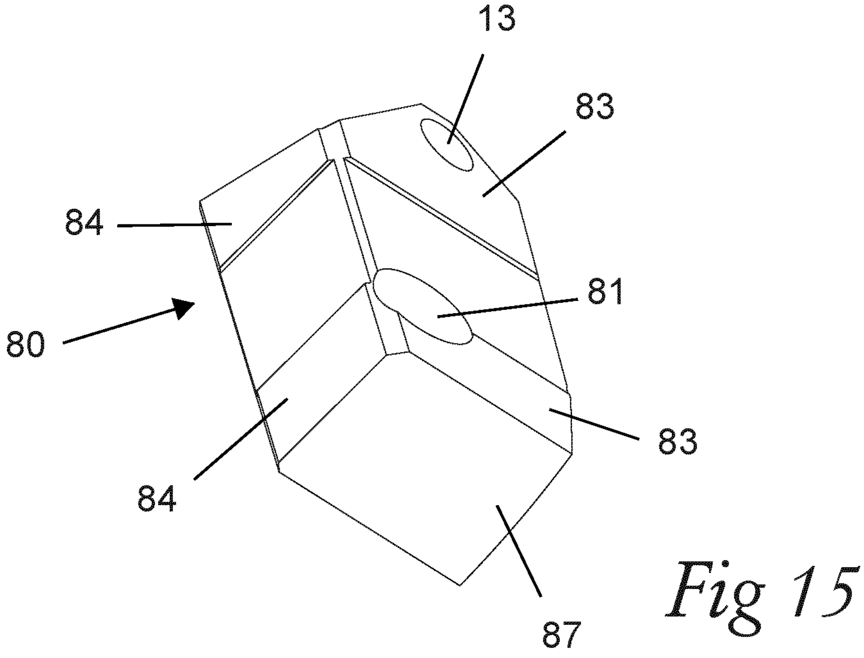
FIG. 15 is a perspective view from another direction of the cassette shown in FIG. 14.
Figure 16:
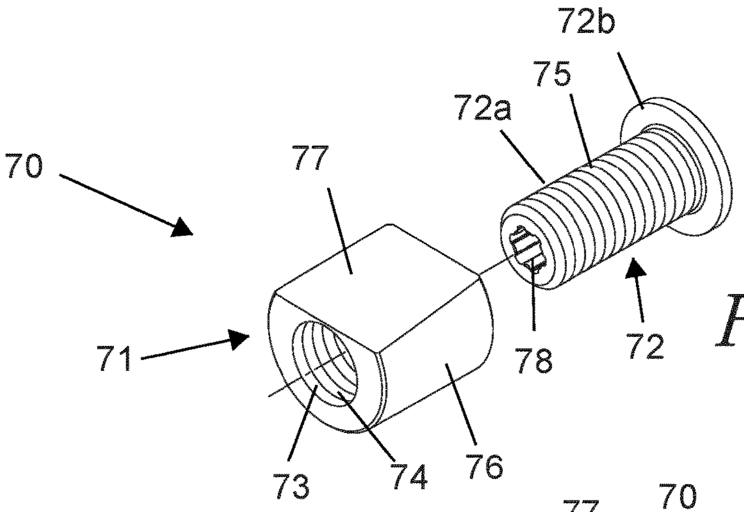
FIG. 16 is an exploded perspective view of the adjustment mechanism shown in FIG. 14.
Figure 17:
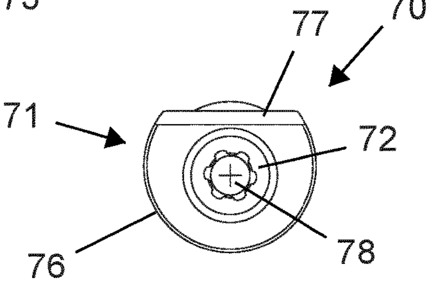
FIG. 17 is a front view of the adjustment mechanism shown in FIG. 14.
Figure 18:
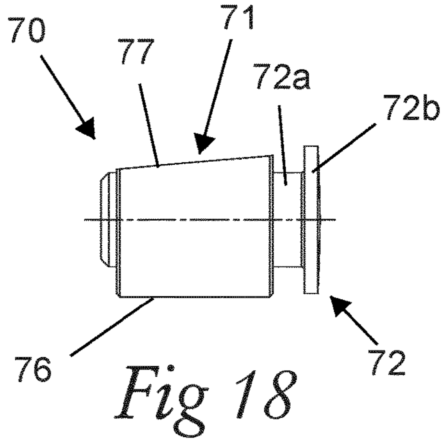
FIG. 18 is a lateral view of the adjustment mechanism shown in FIG. 14.

In the illustrated embodiments, the finishing insert seat 10 is arranged in a cassette 80, which is mounted in the tool body 2 and configured to support the finishing insert 40, 40'. In this case, the position of the finishing insert seat 10 in the axial direction of the tool body 2, and thereby the position of the finishing insert 40, 40' in the axial direction of the tool body 2, is adjustable by adjustment of the position of the cassette 80 in the tool body 2 by means of the adjustment mechanism 70. The tool body 2 is provided with a recess 90 that is configured to accommodate the cassette 80 and the adjustment mechanism 70, wherein this recess 90 is open towards the front end 2*a* of the tool body 2 and towards the periphery 6 of the tool body. In the illustrated example, the cassette 80 is provided with a through hole 81, which is configured to receive a fastening element 82 in the form of a screw. The fastening element 82 extends through the through hole 81 in the cassette 80 and is engaged in a threaded hole 92 in a tangential support surface 93 in the recess 90. The fastening element 82 comprises an elongated shaft 82*a*, which is provided with an external thread configured for engagement with a corresponding internal thread in said threaded hole 92, and a head 82*b*, which is fixed to the shaft 82*a*. The shaft 82*a* has an external diameter that is smaller than the internal diameter of the through hole 81 in the cassette 80 such that the shaft 82*a* is received with play in the through hole 81, to thereby allow a small movement of the cassette 80 in the axial direction of the tool body 2 under the effect of the adjustment mechanism 70 when the position of the finishing insert 40, 40' in the axial direction of the tool body 2 is adjusted by means of the adjustment mechanism. Tangential abutment surfaces 83 (see FIGS. 14 and 15) are provided on a rear side of the cassette 80 and are configured to abut against the tangential support surface 93 in the recess 90 when the cassette is mounted in the recess. The cassette 80 is also provided with radial abutment surfaces 84 (see FIGS. 15 and 19), which are configured to abut against a radial support surface 94 in the recess 90 when the cassette is mounted in the recess. The finishing insert seat 10 is arranged at an upper end of the cassette 80 and the cassette is provided with a bottom surface 87 at an opposite lower end.

Figure 19:
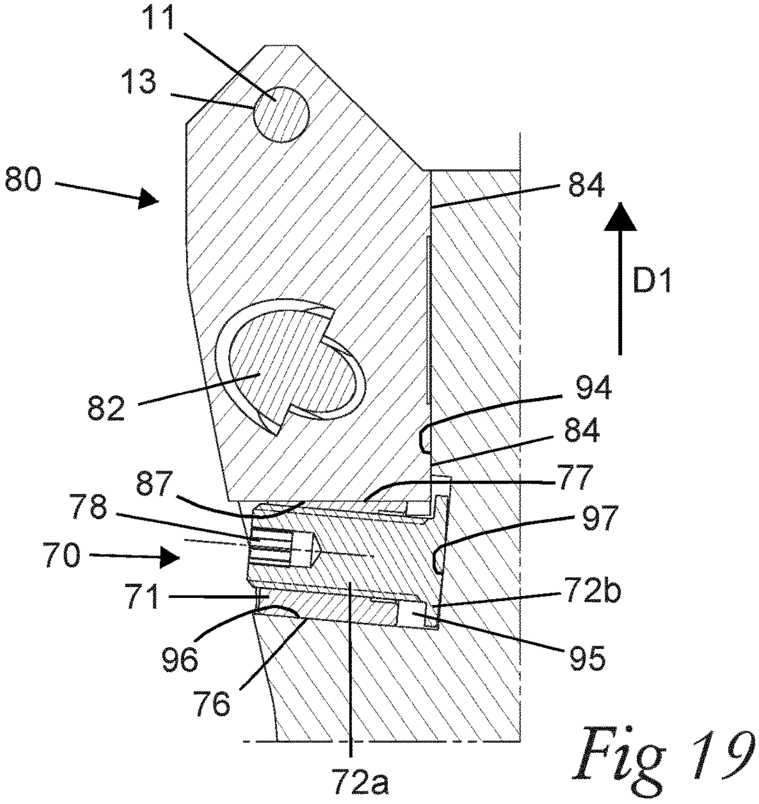
FIG. 19 is a cut according to the line IXX-IXX in FIG. 5, FIGS. 20 and 21 are perspective views from different directions of a cutting insert included in the face milling cutters of FIGS. 1-13.

In the illustrated embodiments, the adjustment mechanism 70 comprises a wedge member 71 and a screw 72, wherein the screw 72 extends through a through hole 73 in the wedge member 71. The screw 72 comprises an elongated shaft 72*a*, which is provided with an external thread 75 configured for engagement with a corresponding internal thread 74 in the through hole 73 in the wedge member 71, and a head 72*b*, which is fixed to the shaft 72*a*. The wedge member 71 is moveable along the shaft 72*a* of the screw when the screw 72 is rotated in relation to the wedge member. The wedge member 71 and the screw 72 are received in a seat 95 at a lower end of the above-mentioned recess 90 in the tool body 2 with an external slide surface 76 on the wedge member 71 in sliding engagement with a corresponding slide surface 96 in the seat 95 and with the head 72*b* of the screw abutting against an inner wall 97 in the seat, as illustrated in FIG. 19. A wedge surface 77 on the wedge member 71 is in sliding engagement with the bottom surface 87 of the cassette 80, wherein this wedge surface 77 has such an inclination in relation to the slide surface 76 that the wedge member 71 will force the cassette 80 forwards in the reference direction D1 when the wedge member 71 is moved radially outwards in the seat 95 along the shaft 72*a* of the screw. A socket 78 designed for releasable engagement with a torque tool (not shown) is provided at the outer free end of the shaft 72*a* of the screw 72 so as to allow a torque tool to be connected to the shaft 72*a* when the screw 72 is to be rotated in order to make the wedge element 71 move the cassette 80 and the associated finishing insert seat 10 forwards in the reference direction D1 in connection with an adjustment of the position of the finishing insert 40, 40' in the axial direction of the tool body 2. The adjustment mechanism 70 may of course also be designed in any other suitable manner.

In the illustrated embodiments, the finishing insert 40, 40' is releasably fixed to the associated finishing insert seat 10 by means of a fastening element 11 in the form of a screw, which extends through a through hole 63, 43 in the finishing insert 40, 40' and is engaged in a threaded hole 13 (see FIGS. 3 and 9) in a tangential support surface 14 in the finishing insert seat 10. The finishing insert seat 10 is also provided with two side support surfaces 15*a*, 15*b* for supporting the finishing insert 40, 40' when mounted in the finishing insert seat 10.

In the illustrated embodiments, the reference insert 50, 50' is releasably fixed to the associated reference insert seat 20 by means of a fastening element 21 in the form of a screw, which extends through a through hole 63, 43 in the reference insert 50, 50' and is engaged in a threaded hole 23 (see FIGS. 4 and 10) in a tangential support surface 24 in the reference insert seat 20. The reference insert seat 20 is also provided with two side support surfaces 25*a*, 25*b* for supporting the reference insert 50, 50' when mounted in the reference insert seat 20.

In the illustrated embodiments, each primary cutting insert 60 is releasably fixed to the associated primary insert seat 30 by means of a fastening element 31 in the form of a screw, which extends through a through hole 63 in the primary cutting insert 60 and is engaged in a threaded hole 33 (see FIGS. 4 and 10) in a tangential support surface 34 in the primary insert seat 30. Each primary insert seat 30 is also provided with two side support surfaces 35*a*, 35*b* for supporting a primary cutting insert 60 when mounted in the primary insert seat 30.

As an alternative to fastening elements 11, 21, 31 in the form of screws, the finishing insert 40, 40', the reference insert 50, 50' and the primary cutting inserts 60 may be configured to be releasably fixed to the associated insert seats 10, 20, 30 by means of suitable clamping means.

In the embodiment illustrated in FIGS. 1-6, the primary cutting inserts 60, the reference insert 50 and the finishing insert 40 are all geometrically identical to each other, or at least substantially geometrically identical to each other. Thus, the primary cutting inserts 60, the reference insert 50 and the finishing insert 40 have the same shape. The cutting inserts 40, 50, 60 illustrated in FIGS. 1-6 are of the type illustrated in closer detail in FIGS. 20-22 but may of course also be designed in any other suitable manner. The cutting insert illustrated in FIGS. 20-22 has a polygonal basic shape and is turnable into four different working positions. The cutting insert comprises first and second major faces 64*a*, 64*b* arranged on opposite sides of the cutting insert and serving as top and bottom faces of the cutting insert. The cutting insert has a centre axis C, which extends between the first and second major faces 64*a*, 64*b*. The cutting insert is provided with a through hole 63, which extends centrally through the cutting insert between the first and second major faces 64*a*, 64*b*. The centre axis C of the cutting insert coincides with the centre axis of the through hole 63. A peripheral relief surface 65 extends around the cutting insert between the first and second major faces 64*a*, 64*b*. The peripheral relief surface 65 comprises a first main side surface 66*a*, a second main side surface 66*b*, a third main side surface 66*c* and a fourth main side surface 66*d*. The peripheral relief surface 65 also comprises:

- a first corner side surface 67*a* located between the first and second main side surfaces 66*a*, 66*b;*
- a second corner side surface 67*b* located between the second and third main side surfaces 66*b*, 66*c;*
- a third corner side surface 67*c* located between the third and fourth main side surfaces 66*c*, 66*d*; and
- a fourth corner side surface 67*d* located between the first and fourth main side surfaces 66*a*, 66*d.*

A first main cutting edge 68*a* extends along the first main side surface 66*a* and is formed at an intersection between the first main side surface 66*a* and the first major face 64*a*. A second main cutting edge 68*b* extends along the second main side surface 66*b* and is formed at an intersection between the second main side surface 66*b* and the first major face 64*a*. A third main cutting edge 68*c* extends along the third main side surface 66*c* and is formed at an intersection between the third main side surface 66*c* and the first major face 64*a*. A fourth main cutting edge 68*d* extends along the fourth main side surface 66*d* and is formed at an intersection between the fourth main side surface 66*d* and the first major face 64*a*.

A first surface-wiping cutting edge 69*a* extends along the first corner side surface 67*a* and is formed at an intersection between the first corner side surface 67*a* and the first major face 64*a*. A second surface-wiping cutting edge 69*b* extends along the second corner side surface 67*b* and is formed at an intersection between the second corner side surface 67*b* and the first major face 64*a*. A third surface-wiping cutting edge 69*c* extends along the third corner side surface 67*c* and is formed at an intersection between the third corner side surface 67*c* and the first major face 64*a*. A fourth surface-wiping cutting edge 69*d* extends along the fourth corner side surface 67*d* and is formed at an intersection between the fourth corner side surface 67*d* and the first major face 64*a*.

Figure 20:
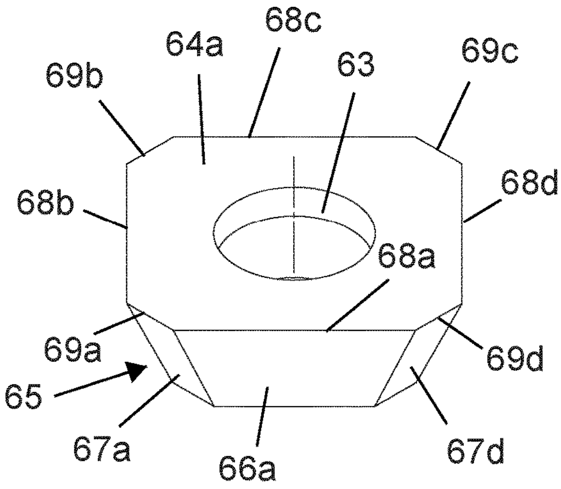
Figure 21:
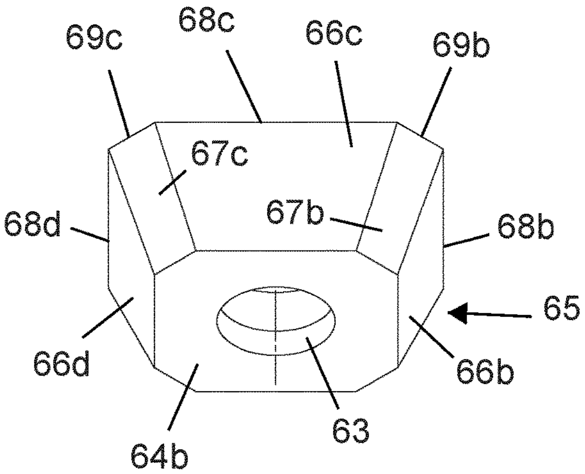
Figure 22:
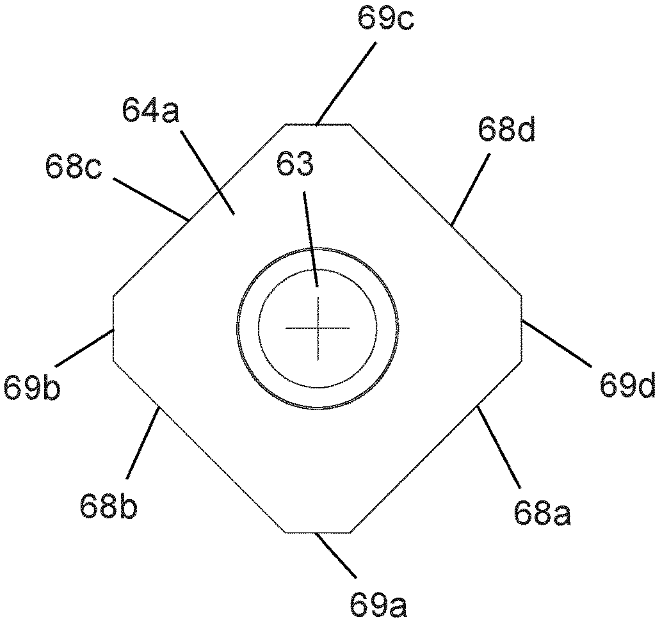
FIG. 22 is a planar view of the cutting insert of FIGS. 20 and 21, FIGS. 23 and 24 are perspective views from different directions of a finishing insert included in the face milling cutters of FIGS. 7-13, FIGS. 25 and 26 are planar views from different directions of the finishing insert of FIGS. 23 and 24.
Figure 23:
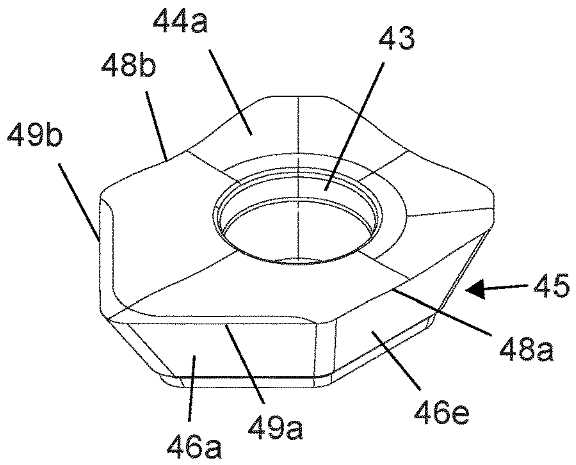
Figure 24:
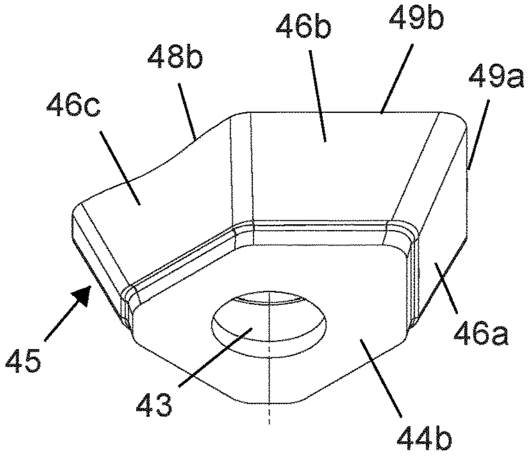
Figure 25:
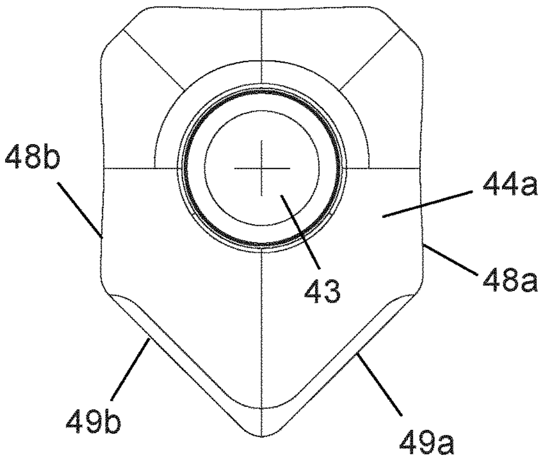
Figure 26:
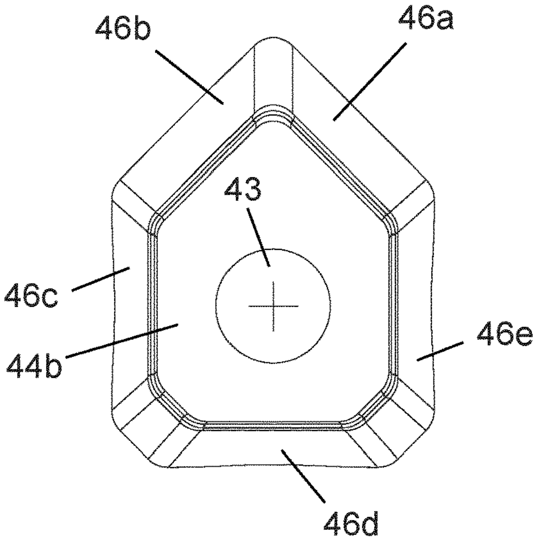
Figure 27:
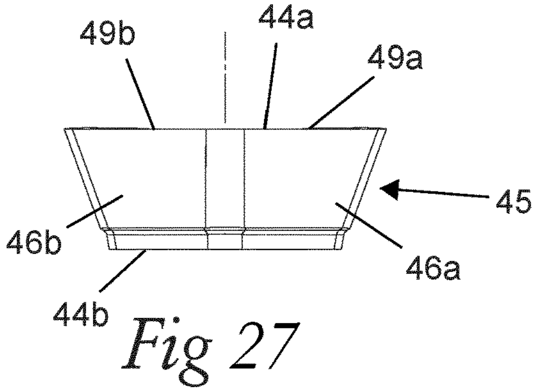
FIG. 27 is a lateral view of the finishing insert of FIGS. 23 and 24.

When mounted in any of the insert seats 10, 20, 30, the cutting insert illustrated in FIGS. 20-22 is so arranged that the second major face 64*b*, or at least a portion thereof, abuts against the tangential support surface 14, 24, 34 in the insert seat in question and two of the main side surfaces 66*a*-66*d*, or at least a portion thereof, abut against a respective one of the two side support surfaces 15*a*, 15*b*, 25*a*, 25*b*, 35*a*, 35*b* in the insert seat in question.

In the embodiments illustrated in FIGS. 7-13, the primary cutting inserts 60 are geometrically identical to each other, or at least substantially geometrically identical to each other, whereas the reference insert 50' and the finishing insert 40' have the form of wiper inserts with a shape that differs from the shape of the primary cutting inserts. The primary cutting inserts 60 illustrated in FIGS. 7-13 are of the type illustrated in closer detail in FIGS. 20-22 and described above but may of course also be designed in any other suitable manner.

The finishing insert 40' and the reference insert 50' illustrated in FIGS. 7-13 are geometrically identical to each other, or at least substantially geometrically identical to each other, and are or the type illustrated in closer detail in FIGS. 23-27 but may of course also be designed in any other suitable manner. The wiper insert illustrated in FIGS. 23-27 has a polygonal basic shape. The wiper insert comprises first and second major faces 44*a*, 44*b* arranged on opposite sides of the wiper insert and serving as top and bottom faces of the wiper insert. The wiper insert is provided with a through hole 43, which extends through the wiper insert between the first and second major faces 44*a*, 44*b*. A peripheral relief surface 45 extends around the wiper insert between the first and second major faces 44*a*, 44*b*. The peripheral relief surface 45 comprises a first main side surface 46*a*, a second main side surface 46*b*, a third main side surface 46*c*, a fourth main side surface 46*d* and a fifth main side surface 46*e*. A first surface-wiping cutting edge 49*a* extends along the first main side surface 46*a* and is formed at an intersection between the first main side surface 46*a* and the first major face 44*a*. A second surface-wiping cutting edge 49*b* extends along the second main side surface 46*b* and is formed at an intersection between the second main side surface 46*b* and the first major face 44*a*. A first main cutting edge 48*a* extends along the fifth main side surface 46*e* and is formed at an intersection between the fifth main side surface 46*e* and the first major face 44*a*. A second main cutting edge 48*b* extends along the third main side surface 46*c* and is formed at an intersection between the third main side surface 46*c* and the first major face 44*a*.

When mounted in any of the finishing and reference insert seats 10, 20, the wiper insert is so arranged that the second major face 44*b*, or at least a portion thereof, abuts against the tangential support surface 14, 24 in the insert seat in question. When the wiper insert of the type illustrated in FIGS. 23-27 is used in a face milling cutter 1 of the types illustrated in FIGS. 7-13 that is configured to be rotated in the direction of rotation R illustrated in FIGS. 7-10, 12 and 13, the wiper insert is to be mounted in the associated insert seat 10, 20 with the first surface-wiping cutting edge 49*a* and the first main cutting edge 48*a* in active cutting positions and with the third and fourth main side surfaces 46*c*, 46*d*, or at least a portion thereof, abutting against a respective one of the two side support surfaces 15*a*, 15*b*, 25*a*, 25*b* in the insert seat in question. However, the wiper insert of the type illustrated in FIGS. 23-27 may also be used in a face milling cutter that is configured to be rotated in the opposite direction of rotation. In the latter case, the wiper insert is to be mounted in the associated insert seat with the second surface-wiping cutting edge 49*b* and the second main cutting edge 48*b* in active cutting positions and with the fourth and fifth main side surfaces 46*d*, 46*e*, or at least a portion thereof, abutting against a respective side support surface in the insert seat in question.

In the embodiment illustrated in FIGS. 1-6, the surface-wiping cutting edges 69*a*-69*d* provided on the finishing and reference inserts 40, 50 have the same length as the surface-wiping cutting edges 69*a*-69*d* provided on the primary cutting inserts 60. In the embodiments illustrated in FIGS. 7-13, the surface-wiping cutting edge 49*a* provided on the finishing and reference inserts 40', 50' are longer than the surface-wiping cutting edges 69*a*-69*d* provided on the primary cutting inserts 60.

The cutting inserts 40, 50, 60 included in the illustrated face milling cutters 1 are single-sided cutting insert with cutting edges arranged only along the periphery of the first major face 44*a*, 64*a*. However, a face milling cutter according to the present invention may as an alternative be provided with one or more double-sided cutting inserts with cutting edges arranged along the periphery of the first major face and also along the periphery of the second major face.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A face milling cutter comprising:

a tool bod having a front end and an opposite rear end, the rear end being configured for attachment to a machine, wherein a longitudinal axis of the tool body extends between the rear end and the front end of the tool body;

at least two primary cutting inserts;

a reference insert;

a finishing insert;

several insert seats provided in the tool body and evenly or at least substantially evenly distributed in a circumferential direction of the tool body, wherein the insert seats comprise:

at least two primary insert seats configured to accommodate a respective one of said at least two primary cutting inserts, wherein each primary cutting insert is configured to be detachably mounted in an associated primary insert seat in a fixed position as seen in an axial direction of the tool body, a reference insert seat configured to accommodate the reference insert, and a finishing insert seat configured to accommodate the finishing insert, wherein the finishing insert is configured to be detachably mounted in the finishing insert seat; and an adjustment mechanism associated with the finishing insert seat for adjustment of a position of the finishing insert in the axial direction of the tool body, wherein the reference insert is configured to be detachably mounted in the reference insert seat in a fixed position as seen in the axial direction of the tool body, wherein the reference insert seat is arranged more forwardly in the tool body than the at least two primary insert seats, as seen in a reference direction from the rear end of the tool body towards the front end of the tool body in parallel with the longitudinal axis of the tool body, such that the reference insert is projecting forwards from the tool body in said reference direction beyond an axially foremost point of each primary cutting insert, wherein the position of the finishing insert in the axial direction of the tool body is adjustable by means of the adjustment mechanism so as to allow the finishing insert to be positioned in the tool body with the axially foremost point of the finishing insert substantially in level with or more forwardly than the axially foremost point of the reference insert as seen in said reference direction, wherein the reference insert seat is arranged in the tool body diametrically opposite or substantially diametrically opposite to the finishing insert seat when said at least two primary insert seats are even in number, and wherein the reference insert seat constitutes one of the two insert seats in the tool body that are arranged closest to a point on the periphery of the tool body located diametrically opposite to the finishing insert seat when said at least two primary insert seats are odd in number.

2. The face milling cutter according to claim 1, wherein the finishing insert seat is arranged in a cassette, which is mountable in the tool body and configured to support the finishing insert.

3. The face milling cutter according to claim 2, wherein the position of the finishing insert in the axial direction of the tool body is adjustable by adjustment of the position of the cassette in the tool body by means of the adjustment mechanism.

4. The face milling cutter according to claim 1, wherein the reference insert seat is arranged 0.02-0.10 mm, more forwardly in the tool body than the at least two primary insert seats as seen in said reference direction.

5. The face milling cutter according to claim 1, wherein a radially outermost point of the finishing insert is arranged closer to the longitudinal axis of the tool body than a radially outermost point of each one of the at least two primary cutting inserts.

6. The face milling cutter according to claim 1, wherein a radially outermost point of the reference insert is arranged closer to the longitudinal axis of the tool body than a radially outermost point of each one of the at least two primary cutting inserts.

7. The face milling cutter according to claim 1, wherein the at least two primary cutting inserts, the reference insert and the finishing insert are substantially geometrically identical to each other.

8. The face milling cutter according to claim 1, wherein the at least two primary cutting inserts and the reference insert are substantially geometrically identical to each other, and that the finishing insert has the form of a wiper insert with a shape that differs from a shape of the at least two primary cutting inserts and the reference insert.

9. The face milling cutter according to claim 1, wherein the at least two primary cutting inserts are substantially geometrically identical to each other, and that each one of the reference insert and finishing insert has the form of a wiper insert with a shape that differs from a shape of the at least two primary cutting inserts.

10. The face milling cutter according to claim 1, wherein the finishing insert and the reference insert are positioned substantially in level with each other as seen in the axial direction of the tool body.

11. The face milling cutter according to claim 10, wherein the finishing insert and the reference insert are each positioned in the tool body with its axially foremost point 0.03-0.07 mm, more forwardly than the axially foremost point of each primary cutting insert as seen in said reference direction.

12. The face milling cutter according to claim 7, wherein the position of the finishing insert in the axial direction of the tool body is adjustable by means of the adjustment mechanism so as to allow the finishing insert to be positioned in the tool body with its axially foremost point 0.03-0.07 mm, more forwardly than the axially foremost point of the reference insert as seen in said reference direction.

13. The face milling cutter according to claim 1, wherein each one of the primary cutting inserts is mountable in the associated primary insert seat in at least two different working positions.

14. The face milling cutter according to claim 1, wherein the reference insert is mountable in the reference insert seat in at least two different working positions.

15. The face milling cutter according to claim 1, wherein the tool body is provided with a marking showing the position of the reference insert seat on the tool body.

* * * * *